April 16, 1963

F. GÖTZE 3,085,304

METHOD OF AND DEVICE FOR PRODUCING PRESSED
MODELS FOR DIES TO BE CAST

Filed Nov. 12, 1959

INVENTOR.
Fritz Götze
BY
Patent Agent

April 16, 1963  F. GÖTZE  3,085,304
METHOD OF AND DEVICE FOR PRODUCING PRESSED
MODELS FOR DIES TO BE CAST
Filed Nov. 12, 1959  2 Sheets-Sheet 2
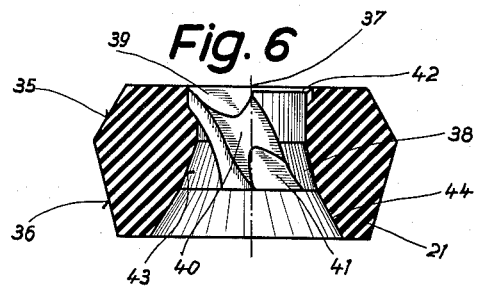
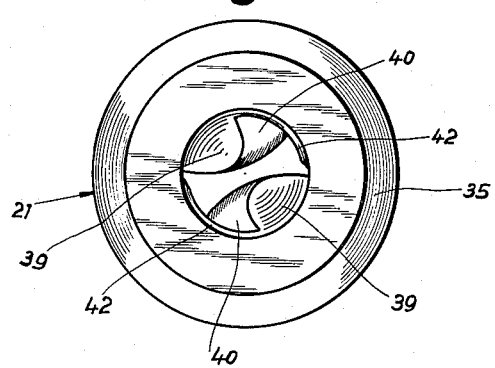
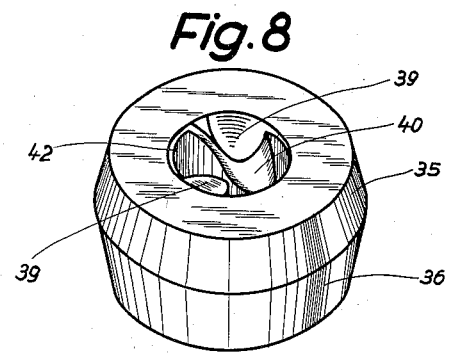
INVENTOR.
Fritz Götze
BY

United States Patent Office 3,085,304
Patented Apr. 16, 1963

3,085,304
METHOD OF AND DEVICE FOR PRODUCING PRESSED MODELS FOR DIES TO BE CAST
Fritz Götze, Pionierstrasse 15, Dusseldorf, Germany
Filed Nov. 12, 1959, Ser. No. 852,349
5 Claims. (Cl. 22—195)

The present invention relates to a method of making pressed blanks for dies to be cast, especially for use in connection with the manufacture of grooved tools.

For a precision manufacture of tools or work pieces such as drills, reamers, broaches and the like provided with straight grooves or curved grooves, massive dies are required which have to have the precise counter shape of the tools or work pieces to be made. With such dies, it is not only important that the inner portion thereof, which produces the shape of the tool or work piece, has the precise counter shape but it is also essential that such counter shape is arranged precisely coaxially in the die and that the outer periphery of the die is precisely machined.

Especially with dies for producing tools or work pieces with curved grooves, it is decisive that the nozzle axis coincides precisely with the axis of the outer die shape. In order to make it possible properly to withdraw the completed tool from the die, in other words to permits a proper withdrawal of the tool in a direction counter to the pressing direction into the die, the die must have its outer circumferential portion so mounted that the withdrawal of the tool from the die will be effected precisely coaxially. It is a matter of course that the introduction of the blank into the die has likewise to be effected coaxially. This is possible only if the outer circumference of the die is located precisely coaxially with regard to the axis of the nozzle. It is indispensable that also the two end surfaces of the blank are precisely angularly located with regard to the nozzle axis because the end faces of the die to be made later, which end faces have firmly to rest on a support, must have a precise angle with regard to the axis of the die in order to prevent a deformation of the desired profile.

For the production of dies of stress resistant alloys, for instance Stellites, the precision casting method only appears to be practical, because a chip removing post machining, especially of the nozzle ribs, of the head and end faces of the nozzle ribs and of the walls of the nozzle is practically impossible.

When making articles of synthetic materials, it is known to produce various forms by pressing, while the shape of the core corresponds precisely to the shape of the hollow chamber to be produced in such article.

In spite of this fact, heretofore known blanks for dies to be cast for making grooved tools have not been made by a pressing operation. The difficulties encountered in connection with a pressing operation for producing blanks for dies to be cast consist primarily in that during the solidification of the pressed materials, a non-uniform shrinking of the blank will take place whereby on one hand a coaxial location of the nozzle axis and the axis of the outer die shape cannot be obtained, and no precisely around circumference of the die can be assured. This drawback was particularly noticeable with grooved tools because the accumulation of material to be pressed was considerably greater in the space between the depth of the grooves of the master or pilot work piece and the outer wall of the metal than between the outer edge of the flanks of the master work piece and the outer edge of the blank which appears to explain the non-uniform shrinking. Furthermore, due to the considerable pressure of the punch upon the material to be pressed and thereby upon the master work piece, it is not always possible to maintain the initial coaxial position of the master work piece in the blank.

It is, therefore, an object of the present invention to provide a method of making pressed blanks for dies to be cast, which will assure that the inner space of the blank, which inner space corresponds to the contour of the work piece to be made, will have a precise coaxial location in the die and will have an outer periphery which is precisely round and coaxial with the nozzle axis.

It is another object of this invention to provide a method as set forth in the preceding paragraph, which will eliminate the consequences of all shrinkages produced during the solidification of the pressed material.

It is another object of this invention to provide a method of the above mentioned character which will improve the possibility of precisely centering the blank or the die.

These and other objects and advantages of the invention will appear more clearly from the following specification in connection with the accompanying drawings, in which.

Figure 3:
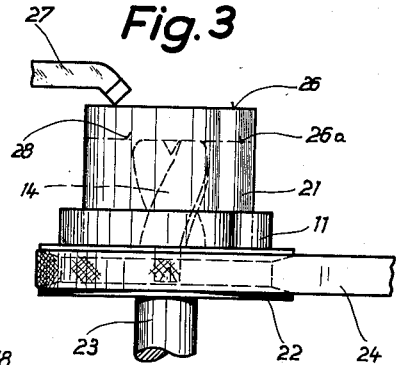

FIG. 3 illustartes the turning or grinding of that end face of the blank which is located between the press punch and one end face of the master work piece.

Figure 4:
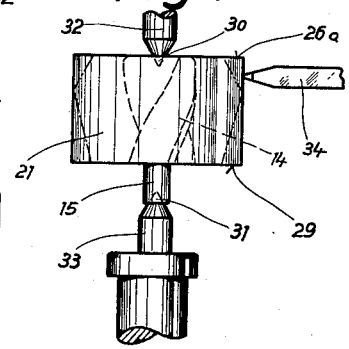

FIG. 4 shows the machining of the outer circumference of the blank.

Figure 5:
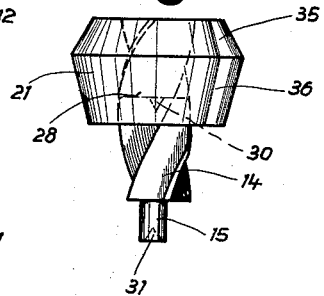

FIG. 5 illustrates the removal of the master work piece from the blank.

FIG. 6 is a section through the completed work piece.

FIG. 7 is a top view of FIG. 6.

FIG. 8 is a perspective view of the completed work piece with machined nozzle.

General Arrangement

According to the present invention and, more specifically, according to the method of the invention of producing pressed pattern blanks for dies to be cast, especially for making grooved tools, the blank is pressed while receiving a master or pilot work piece, whereupon the pressed blank with the master work piece is chucked precisely coaxially with regard to said master work piece and, while so chucked, is turned for instance on a customary lathe. In this way, the outer circumference of the blank will be machined coaxially with regard to the master work piece. Finally, the blank is detached from the master work piece. In view of this method, the interior of the blank will correspond as to its shape to the shape of the tool to be made later. The said interior of the blank will have a precisely coaxial position in the die and the outer circumference of the blank will be precisely round and coaxial with regard to the nozzle axis which facts are of particular importance in connection with the making of tools having rounded grooves. The consequence of all shrinkages during the solidification of the pressed material will be obviated by the method according to the invention.

According to a further development of the method according to the invention, following the pressing of the blank, that portion of the blank which is located between the press punch and one end face of the master work piece will first be removed roughly, and subsequently the thus formed end faces of the blank will be machined simultaneously with the machining of the outer circumference so that the said end faces will be precisely perpendicular to the nozzle axis. The method may also be carried out in such a way that, following the removal of the material between the press punch and one end face of the master work piece, the end faces of the pressed blank will right away be machined plane and perpendicular to the nozzle axis whereupon the outer circumference of the blank will be machined precisely round and coaxial with the axis of the nozzle.

Preferably, the outer circumference of the blank is turned so as to form a double truncated cone which will allow a highly satisfactory chucking of the blank and of the die. The precise centering possibility of the blank or die will be greatly increased in this way. Thus, following the removal of the master work piece from the blank, the cone-shaped head and bottom surfaces of the nozzle ribs and the cone-shaped walls of the nozzle bore may be turned while the blank will be chucked along its circumference precisely coaxial with regard to the nozzle axis. With the method according to the invention, a master work piece is employed whose ends are provided with centering means arranged in the longitudinal direction of the master work piece.

Structural Arrangement

The method according to the present invention as illustrated in the drawings employs a press which comprises a base plate 10 and a mold 11 surrounded by a jacket 12 the interior of which may be filled with a heating liquid through an opening in said jacket (not shown) or other heating means. If desired, the jacket 12 may also be provided with an insulating material.

Figure 1:
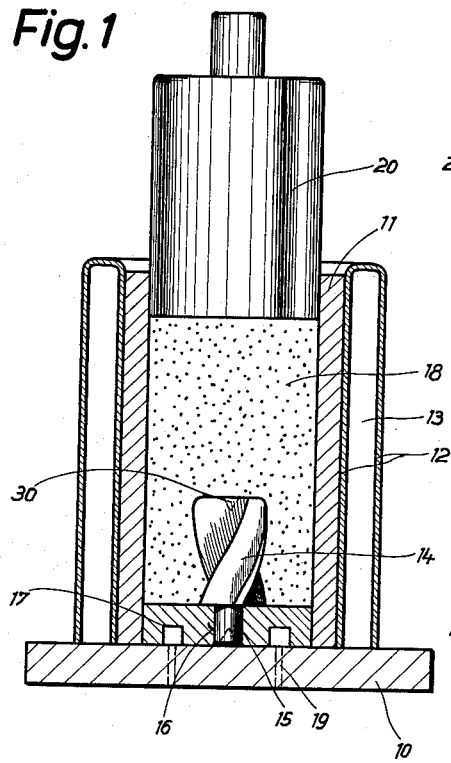
FIG. 1 illustrates a diagrammatic section through a mold filled with material to be pressed, and also shows in view the press punch and the master or pilot work piece.
Figure 2:
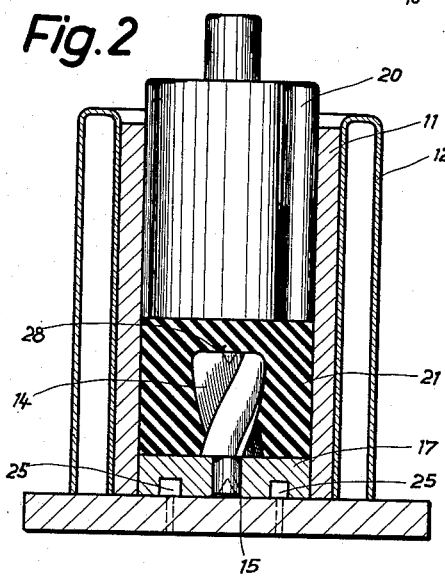
FIG. 2 shows the material in pressed condition with the master work piece embedded in the pressed blank.

The method according to the invention is furthermore carried out by the employment of a master or pilot work piece 14 having a stud 15 connected thereto which has its longitudinal axis in precise alignment with the longitudinal axis of the pilot work piece 14. Stud 15 engages a corresponding opening 16 in a pressure plate 17. Pressure plate 17 is mounted on base plate 10 in mold 11, and the inner space of the mold 11 is in a manner known per se filled with the material 18 to be pressed into the desired blank. Preferably, pressure plate 17 is so machined that it fits precisely concentrically into the mold 11. In order to allow air entrapped between plate 17 and plate 10 to escape, plate 10 is preferably provided with a number of bores 19. The arrangement shown in FIG. 1 furthermore comprises a punch 20 for pressing the material 18 to the blank 21 (FIG. 2) in a manner known per se, whereupon the thus pressed blank together with the pilot work piece 14 and pressure plate 17 will be removed from mold 11. Subsequently, the thus obtained blank together with the pressure plate 17 will be mounted on a pulley 22 (FIG. 3) which is rotatable about a shaft 23 by means of a V-belt 24. Such pulleys are well known in the art so that their journalling and drive does not have to be described further.

Pulley or disc 22 is provided with studs (not shown) which extend upwardly into the bores 25 (FIG. 2) of pressure plate 17. It will thus be obvious that when pulley 22 is rotated, also blank 21 will rotate. The end face 26 is engaged by a chip removing tool 27 which will machine the end face 26 when pulley 22 is rotated and either tool 27 is fed toward pulley 22 or pulley 22 is fed toward the tool 27. By means of tool 27 that portion of blank 21 is turned off which is located between the end face as shown in FIG. 3 and the line 26a which latter is substantially on the level of the end face 28 of the pilot work piece 14.

Tool 27 may first roughly machine the end face of the blank 21 up to line 26. However, if desired, the end face to be formed may be ground plane to line 26a and perpendicularly to the pilot work piece 14. If first a rough grinding is effected, later the finishing grinding will be effected together with the machining of the circumference of the blank.

After the blank has been machined down from surface 26 to line 26a, the pressure plate 17 is removed from the blank so that the lower end face 29 (FIG. 4) of the blank will be accessible. As will be seen from FIG. 5, the pilot work piece 14 has its upper end face 28 provided with a little central bore 30 which, however, was filled with pressed material during the pressing operation. By means of a simple tool, the small cone-shaped accumulation of pressed material can easily be removed from said bore 30 of the hardened pilot work piece 14. A similar central bore 31 is provided in the outer end of stud 15. The pilot work piece is now inserted into a lathe and, more specifically, between the points 32 and 33 thereof, whereupon said pilot work piece is rotated and the circumference of the blank 21 is machined by means of a tool 34. The machining is, in conformity with the drawings, carried out in such a way that two truncated cone-shaped outer surfaces 35 and 36 will be obtained. Experience has shown that when machining the blank 21 in the above mentioned manner, the blank will not detach itself from the pilot work piece. The machining of the circumferential surface of the blank for obtaining the two conical sections 35 and 36 may also be carried out in such a way that two work pieces simultaneously produce the surfaces 35 and 36.

After the outer circumference of blank 21 has been machined precisely coaxially with regard to the longitudinal axis of the pilot work piece 14, the pilot work piece will be removed from blank 21, which latter will then be chucked along its circumference.

Inasmuch as the outer circumference of the blank 21 was made precisely coaxial with the master work piece and thus is coaxial with the longitudinal axis 37 of the inner contour or nozzle 38 of blank 21, it is now possible precisely to machine the inner walls of said nozzle. Heretofore, such machining was either not possible at all or only under poor conditions so that a precise coaxial location of the outer circumference of blank 21 to its nozzle opening was not possible.

Blank 21 will then be chucked in known manner along its surfaces 35, 36 whereupon the top surface 39 of the nozzle ribs 40 as well as the bottom surfaces 41 will be turned conical. Also the surfaces 42 bordering the nozzle ribs and located the upper end of the nozzle opening 38 as well as the conical surfaces 43, 44 in the interior of the nozzle will be turned conical. A precise concentric location of these surfaces will now be possible since the outer circumference is precisely coaxial with the axis 37. During or following the machining of the nozzle surfaces, also the second end face 29 of the blank may be shaped plane and at a rectangle to the nozzle axis 37.

It is, of course, to be understood that the present invention is, by no means, limited to the particular method and devices described above and shown in the drawings but also comprises any modifications within the scope of the appended claims. In this connection, it is also to be understood that while the drawings illustrate a pilot work piece with wound nozzle ribs, the method according to the invention is also applicable to pilot work pieces with straight grooves and straight nozzle ribs.

While the pattern referred to in the preceding description may be pressed of any suitable material in conformity with the respective article to be made, materials such as polystyrene and wax have proved particularly advantageous in connection with the making of patterns for dies to be cast for use in connection with the making of grooved tools.

What I claim is:

1. A method of making a pattern for casting dies, especially for the manufacture of grooved tools, which includes the steps of: inserting into a mold a pilot work piece corresponding to the work piece eventually to be made by the die to be cast, and with all but one end of the pilot workpiece exposed, said pilot workpiece being provided with means coaxial therewith for mounting said workpiece for rotation after removal thereof from said mold, filling material to be pressed into said mold, subjecting said material to a pressure for pressing a pattern that completely surrounds said pilot workpiece except for said one end, removing the thus pressed blank together with the pilot workpiece therein from said mold, mounting by said mounting means the thus pressed blank together with said pilot workpiece therein for rotation on the axis of the pilot workpiece, machining an end face of said blank to expose the corresponding end of the pilot workpiece with said one end thereto, and machining the circumference of the blank so that said pilot workpiece in said blank and the circumferential surface of said blank are coaxial with each other, and withdrawing said blank and said pilot workpiece from each other.

2. A method of making a pattern for casting dies, especially for the manufacture of grooved tools, which includes the steps if: inserting into a mold a pilot work piece corresponding to the work piece eventually to be made by the die to be cast and with one end face of the pilot workpiece confined and the other exposed, said pilot workpiece being provided with stud means coaxial therewith for mounting said workpiece for rotation after removal thereof from said mold, filling material to be pressed into said mold, subjecting said material to a pressure for pressing a pattern blank around said pilot work piece, removing the thus pressed blank together with the pilot work piece therein from said mold, mounting by said stud means the thus pressed blank together with said pilot work piece therein for rotation on the axis of the pilot workpiece, roughly removing that portion of the pressed blank which is located between one end face of the pilot work piece and the adjacent end face of said blank, supporting the blank and pilot workpiece by engaging the pilot workpiece at its opposite ends on the axis thereof, machining the circumferential surface of said blank and simultaneously finish machining the end faces of said blank while so supported so that said end faces will be perpendicular to the axis of said pilot work piece, and withdrawing said blank and said pilot workpiece from each other.

3. A method of making a pattern for casting dies, especially for the manufacture of grooved tools, which includes the steps of: inserting into a mold a pilot work piece corresponding to the work piece eventually to be made by the die to be cast and with one end face of the pilot workpiece confined and the other exposed, said pilot workpiece being provided with end bores coaxial therewith for mounting said workpiece for rotation after removal thereof from said mold, filling material to be pressed into said mold, subjecting said material to a pressure for pressing a pattern blank around said pilot work piece so that one end face of said pilot work piece is likewise covered by a layer of pressed material, removing the thus pressed blank together with the pilot work piece therein from said mold, supporting the blank and pilot workpiece for rotation on the axis of the workpiece, removing said layer from said blank while so supported and while said pilot work piece is in the latter and machining the thus formed end face of said blank so that said last mentioned end face will be perpendicular to the axis of said pilot work piece, supporting the blank and pilot workpiece by engaging the pilot workpiece at its opposite ends on the axis thereof by means of said end bores, machining the outer periphery of the blank while so supported coaxial with the axis of said pilot work piece and machining the other end face of the blank perpendicular to the axis of said pilot work piece, and withdrawing the thus formed blank and said pilot work piece from each other.

4. A method of making a pattern for casting dies, especially for the manufacture of grooved tools, which includes the steps of: inserting into a mold a pilot work piece corresponding to the work piece eventually to be made by the die to be cast, filling material to be pressed into said mold, subjecting said material to a pressure for pressing a pattern blank around said pilot work piece including a pressed layer of said material above one end face of said pilot work piece, removing the thus pressed blank with said pilot work piece therein from said mold, supporting the blank and pilot workpiece for rotation on the axis of the pilot workpiece, removing said layer from said blank while finish machining the end faces of said blank plane and perpendicular to the longitudinal axis of said pilot work piece supporting the blank and pilot workpiece by engaging the opposite ends of the pilot workpiece on the axis thereof, and machining the circumferential surface of said blank while so supported into a shape of two truncated cones resting upon each other along their larger end surface and, subsequently withdrawing the thus formed blank and said pilot work piece from each other.

5. A method of making a pattern for casting dies, especially for the manufacture of grooved tools, which includes the steps of: inserting into a mold a pilot work piece corresponding to the work piece eventually to be made by the die to be cast, filling material to be pressed into said mold, subjecting said material to a pressure for pressing a pattern blank around said pilot work piece including a pressed layer of said material above one end face of said pilot work piece, removing the thus pressed blank with said pilot work piece therein from said mold, supporting the blank and pilot workpiece for rotation on the axis of the pilot workpiece, removing said layer from said blank while finish machining the end faces of said blank plane and perpendicular to the longitudinal axis of said pilot work piece supporting the blank and pilot workpiece by engaging the opposite ends of the pilot workpiece on the axis thereof, and machining the circumferential surface of said blank while so supported into a shape of two truncated cones resting upon each other along their larger end surface, subsequently withdrawing the thus formed blank and said pilot work piece from each other, following the removal of said blank chucking the circumferential surface thereof, and finish machining the ribs and walls of the bore of said blank formed by said pilot work piece in said blank.

References Cited in the file of this patent

UNITED STATES PATENTS

| | | |
|---|---|---|
| 1,976,009 | De Bats | Oct. 9, 1934 |
| 2,396,195 | Pattison | Mar. 5, 1946 |
| 2,930,115 | Dietzach et al. | Mar. 29, 1960 |

OTHER REFERENCES

United States Gysum, IGL Bulletin No. ITT–100–D, pages 1–5, and IGL Bulletin No. ITT–100–E, pages 1–4.

United States Gypsum Product Information, IGL Bulletin No. ITT–52, 1955, page 4.